United States Patent [19]

Kesten et al.

[11] Patent Number: 5,394,685
[45] Date of Patent: Mar. 7, 1995

[54] METHOD AND APPARATUS TO ENHANCE COMBUSTION RATES AND EXTEND EXTINCTION LIMITS IN HIGH SPEED PROPULSION UNITS

[75] Inventors: Arthur S. Kesten, West Hartford; Alexander Vranos, Ellington; William M. Proscia, Marlborough, all of Conn.

[73] Assignee: United Technologies Corporation, Hartford, Conn.

[21] Appl. No.: 612,763

[22] Filed: Nov. 14, 1990

[51] Int. Cl.[6] .......................... F02G 3/00; F02K 7/00
[52] U.S. Cl. .................................. 60/39.02; 60/210; 60/270.1
[58] Field of Search ............... 60/215, 266, 267, 210, 60/270.1, 39.02

[56] References Cited

U.S. PATENT DOCUMENTS

| | | | |
|---|---|---|---|
| 3,149,458 | 9/1964 | Harris | 60/210 |
| 3,167,913 | 2/1965 | Muhlberg et al. | 60/39.02 |
| 3,765,167 | 10/1973 | Rudolph et al. | 60/39.02 |
| 4,147,136 | 4/1979 | Noguchi et al. | 123/3 |
| 4,430,095 | 2/1984 | Gilbert | 48/180 |
| 4,567,857 | 2/1986 | Houseman et al. | 123/3 |
| 4,716,859 | 1/1988 | König et al. | 123/3 |
| 5,012,638 | 5/1991 | Grieb et al. | 60/270.1 |

OTHER PUBLICATIONS

Mach 2 Combustion Characteristics of Hydrogen/Hydrocarbon Fuel Mixtures; Diskin, et al; Oct. 5–8, 1987; pp. 155–169.

Analytical Study of Catalytic Reactors Which Promote Endothermic Reactions of Hydrocarbon Fuels; Kesten; Jun. 16–18, 1969.

H. Lander and A. C. Nixon, Endothermic Fuels for Hypersonic Vehicles, vol. 8, No. 4, pp. 200–207, Journal of Aircraft, 1971.

*Primary Examiner*—David Brown
*Attorney, Agent, or Firm*—George J. Romanik

[57] ABSTRACT

A stream of hydrocarbon fuel is catalytically decomposed to produce hydrogen and lower molecular weight fuel fragments, which may separated by molecular size. The hydrogen and low molecular weight fuel fragments are introduced along with a stream of non-decomposed hydrocarbon fuel into the combustor of a high speed propulsion unit. The method results in a wider combustor operating range, with higher combustion rates and increased flame stability, achieved through more rapid diffusional mixing. The process effectively extends the operating limits of gas turbines, and especially ramjet and scramjet combustors.

10 Claims, 4 Drawing Sheets

METHOD AND APPARATUS TO ENHANCE COMBUSTION RATES AND EXTEND EXTINCTION LIMITS IN HIGH SPEED PROPULSION UNITS

TECHNICAL FIELD

The present invention relates to methods to enhance combustion rates and extend extinction limits in high speed propulsion units such as ramjet and scramjet engines.

BACKGROUND ART

High-speed propulsion requires very rapid mixing and combustion of fuel and air. Most practical combustors, including combustors for high speed transport, are turbulent non-premixed systems. In most turbulent combustion systems, aerodynamic mixing is relied upon to mix small packets of fuel with small packets of air. In the initial stages of mixing, large eddies are formed in which fuel and air are mixed reasonably well on a macroscopic scale. In the final stages of mixing, however, fuel and air molecules mix by molecular diffusion. This final mixing is responsible for bringing together fuel and air molecules for reaction. We believe that the significance of this last step in the mixing process has been underestimated and it now appears that this may be a critical or limiting process in many high velocity combustion systems.

In turbulent flames, reacting flame elements are elongated by the turbulence, leading to "stretching" of the flame. The process is very similar to that observed when a candle flame is stretched by blowing. With sufficiently rapid or extensive stretching, the candle flame is blown out. Flame elements in combustors can be extinguished in a similar manner. In combustor jet flames, choice of fuel can greatly increase stretch tolerance. The amount and rate of stretching a flame can tolerate before being extinguished is called its extinction limit.

The addition of hydrogen and small hydrocarbon molecules to hydrocarbon fuels is known to increase flame extinction limits under laminar flow conditions by increasing the rate of combustion. The increased combustion rate is due to more rapid mixing of fuel and air by molecular diffusion. Evidence uncovered in recent years suggests that molecular scale mixing in turbulent combustion systems occurs in laminar flamelets in which molecular diffusion is the mechanism by which fuel and air molecules meet for reaction. Thus, it has been proposed that adding hydrogen and small hydrocarbon molecules to hydrocarbon fuels will increase the combustion rate and hence, will increase flame extinction limits even in turbulent combustion systems. Other possible effects of hydrogen addition, such as increased flame temperature, and increased hydrogen atom and hydroxyl radical concentrations are also likely to have a positive influence on the combustion rate and flame extinction limits.

Currently, gas turbine engines used for aircraft propulsion are fueled with liquid hydrocarbons because these fuels have relatively high energy densities, are readily available, and have favorable handling logistics. The fact that liquid hydrocarbon fuels do not produce flames with especially high extinction limits is ordinarily not limiting. Some proposed applications however, such as supersonic or hypersonic aero-space transport, require fuels with higher combustion rates and wider extinction limits than liquid hydrocarbons can provide. Liquid hydrogen has been proposed for some systems because it has wider ignition and blowout limits and a specific energy three times that of liquid hydrocarbon fuels. However, hydrogen, even when stored in a liquid state at cryogenic temperatures, has an energy density only a third that of typical liquid hydrocarbon fuels. As a result, the use of hydrogen as a fuel would require significantly larger fuel tank capacity than if liquid hydrocarbons were used as a fuel. Thus, in volume-limited systems, a fuel with a higher energy density than hydrogen and wider extinction limits than typical hydrocarbon fuels would be desirable.

Mixtures of hydrogen and hydrocarbon fuels have specific energies and energy densities between those of either component alone and offer the potential for combustion efficiency and flame stability which is also intermediate to that of hydrogen and hydrocarbon fuels. Thus, a fuel with an acceptable energy density and extinction limit can be formulated by mixing hydrogen and hydrocarbon fuels. Dual fuel systems, which would have separate liquid hydrogen and hydrocarbon tanks, would require less total system tankage than a purely hydrogen fuel system. However, such a system would be complex because it retains the requirement for liquid hydrogen storage, while adding the need for two separate fuel supply systems.

In a report of the 24th JANNAF Combustion Meeting, October 1987, "Mach 2 Combustion Characteristics of Hydrogen/Hydrocarbon Fuel Mixtures", Diskin et al. discussed the feasibility of mixing hydrocarbons into a hydrogen fuel system as a technique to increase fuel density for scramjet combustors. Although addition of liquid hydrocarbons to a hydrogen fuel was shown to increase fuel density while maintaining acceptable combustion performance, the mixed fuel system did not overcome the handling problems associated with liquid hydrogen fuels, and as disclosed, would require a dual fuel delivery system.

Accordingly, if routine supersonic or hypersonic aero-space transport is to become a practical reality, it will be highly desirable to have a method to enhance combustor performance using a single fuel source.

DISCLOSURE OF THE INVENTION

The present invention is directed towards providing a method of enhancing high speed combustor performance using a single fuel source.

Another aspect of the invention includes a method of extending the operating limits and flame stability of a combustor in a high speed propulsion unit by catalytically decomposing at least a portion of a stream of hydrocarbon fuel to produce hydrogen and lower molecular weight fuel fragments, separating the decomposition products by molecular size, and introducing the hydrogen, lower molecular weight fuel fragments, and non-decomposed hydrocarbon fuel into a combustor of a high speed propulsion unit. The introduction of hydrogen and lower molecular weight fuel fragments into the combustor leads to more rapid molecular mixing of fuel and air, which in turn leads to increased combustion rates and extended extinction limits.

Another aspect of the invention includes a method to provide an effective sink for aerodynamic heat loads of a high speed aircraft while extending the operating limits and flame stability of a combustor in a propulsion unit of the aircraft. The heat sink and flame stability are provided by transferring heat from a heat source of the aircraft to a catalytic reactor by means of a heat exchange fluid, endothermically decomposing a stream of hydrocarbon fuel in the reactor to produce hydrogen and lower molecular weight fuel fragments, and introducing the hydrogen, lower molecular weight fuel fragments, and nondecomposed hydrocarbon fuel to a combustor of a propulsion unit of the aircraft. The heat exchange fluid used to transfer heat to the catalytic reactor is the hydrocarbon fuel.

Another aspect of the invention includes a combustion apparatus for use in a high speed propulsion unit. The combustion apparatus includes a combustor having a hydrogen pilot flame, a means for catalytically decomposing at least a portion of a stream of hydrocarbon fuel to produce hydrogen and lower molecular weight fuel fragments, a means for separating hydrogen from decomposition products, and a means for introducing the hydrogen into the combustor to produce a hydrogen pilot flame.

The foregoing and other features and advantages of the present invention will become more apparent from the following description and drawings.

BEST MODE FOR CARRYING OUT THE INVENTION

Figure 1:
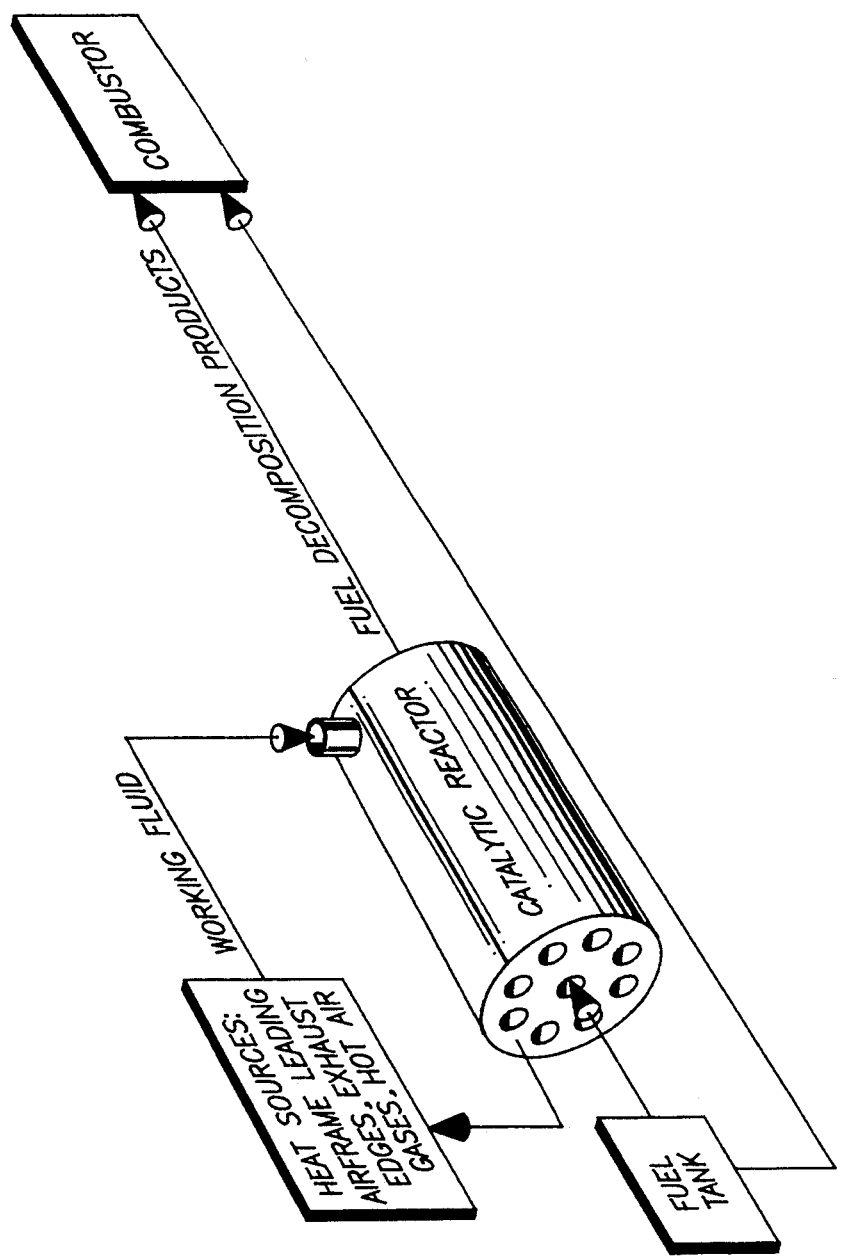
FIG. 1 illustrates a basic embodiment of this invention in which decomposed hydrocarbon fuel is fed directly to a combustor without separating the lower molecular weight decomposition fragments.

The present invention discloses a method for enhancing the rate of continuous combustion in a turbulent combustion system in which fuel and air are injected separately. The method is applicable to gas turbine, ramjet, and scramjet combustors or any propulsive device where extending the operating limits and flame stability while maximizing energy density of the fuel is advantageous.

Energy is stored chemically in a liquid hydrocarbon fuel which has a relatively high energy density. The fuel must be one which can be endothermically decomposed into hydrogen and lower molecular weight fuel fragments. Such fuels are referred to as endothermic fuels. The fuel should contain from one to about 14 carbon atoms. It may be an oxygenate such as an alcohol. In particular, normal paraffins, including pentane, heptane, and decane; naphthenes, including methylcyclohexane, cyclohexane, and decalin; and alcohols, including methanol, ethanol, and propanol are suitable fuels. Combinations of these fuels are also suitable. Methylcyclohexane is a preferred fuel because it decomposes cleanly to toluene and hydrogen with minimal formation of side products.

The fuel is vaporized and catalytically decomposed in a catalytic reactor into hydrogen and lower molecular weight fuel fragments. The particular fuel fragments produced will depend on the particular fuel fed to the reactor. For example, if methylcyclohexane is used as the fuel, one molecule of fuel will be decomposed into three hydrogen molecules and one toluene molecule. Depending on reaction conditions, small amounts of light hydrocarbons such as methane might be formed. Because the products are in the gas phase, the resulting fuel mixture will be about 75% hydrogen by volume, assuming 100% conversion of the methylcyclohexane. If the conversion is less than 100%, there will be proportionally less hydrogen in the resulting fuel mixture.

The catalyst used in the reactor may be any catalyst which promotes the endothermic decomposition of a hydrocarbon into hydrogen and lower molecular weight fragments. The preferred catalysts include those comprising platinum family metals, such as platinum, rhodium, iridium, and palladium. Catalysts which contain other metals such as nickel, chromium, and cobalt have also been shown to be effective. The catalysts may comprise a single metal or a combination of suitable metals.

Typically, the catalytic metals are supported in the reactor on a substrate such as alumina or zirconia. The particular support mode chosen depends on the amount of catalyst surface area required and the amount of pressure drop which can be tolerated in the reactor. A packed bed of catalyst particles may be used where a large surface area is needed and the inherent high pressure drop is not a problem. A coated wall may be used if pressure drop is a primary limitation and a large surface area is not required. A monolith, generally having a honeycomb structure, provides a compromise between a packed bed and a coated wall. It combines a moderate amount of surface area with a reasonably low pressure drop. As a result, a monolith structure is the preferred catalyst support mode.

The reactor operating conditions depend on the amount of catalyst available, the particular fuel being used, and the conversion from fuel to hydrogen and lower molecular weight fuel fragments desired. Typically, the reactor may be operated under pressures from about 0.1 atm to about 70 atm. Reactor inlet temperatures may range from about 200° F. to about 1400° F. If methylcyclohexane is used as the fuel, a reactor inlet temperature from about 400° F. at reduced pressures down to about 0.1 atm to about 1000° F. at pressures up to about 60 atm will result in substantial conversion.

The energy required to heat and vaporize the fuel and to drive the endothermic decomposition reaction is transferred to the reactor using an appropriate heat exchange fluid which may be circulated to scavenge heat from heat sources. The working fluid may be the fuel itself, engine exhaust gases, hot air from engine inlet boundary layer suction, hydrogen, or any other suitable fluid. Engine exhaust gases and hot air are heat sources themselves and probably will not require circulation to other heat sources in order to supply adequate energy to the reactor. Other working fluids may be circulated to draw heat from airframe leading edges or other parts of the aircraft which are susceptible to heating, especially those which require cooling. Depending on the heat source and working fuel chosen, heat for the reactor might not be available throughout the entire operation cycle. For example, if heat is to be drawn from aircraft leading edges, sufficient heat will not be available during takeoff. However, hydrogen addition to fuel is not required at the low speeds encountered at takeoff.

Reactor effluent, which comprises hydrogen, lower molecular weight fuel fragments, and nondecomposed fuel may be separated by molecular size. The separation may be accomplished with any material through which hydrogen and other small molecules will preferentially diffuse. A preferred separator will contain a palladium membrane. Palladium provides extraordinary selectivity for hydrogen, but usually at the expense of fairly high pressure drop. Typically, the palladium membrane will be from about 0.01 mm to about 10 mm in thickness. The particular thickness is a design parameter. Depending on the application, the thickness may vary to afford different diffusion rates. Those skilled in the art can readily determine the appropriate thickness using a source such as "Diffusion In and Through Solids" by Richard M. Barrer (Cambridge University Press, London, 1941), Chapter 5, which is hereby incorporated by reference. Barrer describes the permeation velocity of hydrogen through metals like palladium. Hollow glass fiber or polymeric fiber materials which are less hydrogen selective, but which have a lower pressure drop would also be suitable for use in the separator. A suitable family of hydrogen specific polymeric fiber materials, called Prism TM Separators, is available from Permea Corporation (St. Louis, Mo.).

Finally, hydrogen, lower molecular weight fuel fragments, and nondecomposed fuel are fed to the combustor where the presence of the hydrogen and other small molecules results in improved combustion. Under some circumstances, the combustion process can be further enhanced by injecting the hydrogen and other small fuel species upstream of the main fuel injection point in order to pilot the main fuel burner. This sort of staged injection is possible if the hydrogen and small molecules, if any, were separated from other fuel decomposition products as described above. Various possible fuel feed schemes are discussed below.

In the embodiment shown in FIG. 1, a liquid hydrocarbon fuel, such as methylcyclohexane, is stored in a fuel tank and is pumped to a catalytic reactor. The reactor contains a platinum family catalyst supported by a honeycomb structured monolith, preferably comprising alumina. A working fluid which draws heat from any of the heat sources of the aircraft provides the necessary heat of reaction. Fuel entering the reactor is vaporized and at least partially catalytically decomposed to hydrogen and lower molecular weight fuel fragments. The decomposition products are fed directly into the combustor of a high speed engine to improve the combustion rate and flame stability.

Figure 3:
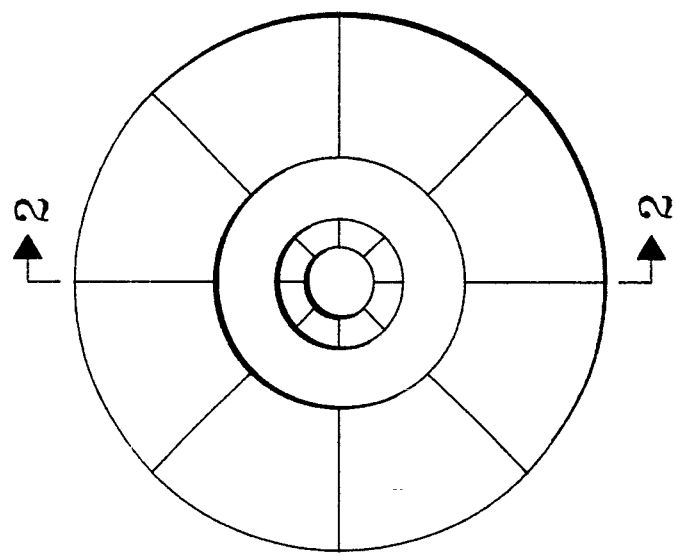
FIG. 3 is a front view schematic of the fuel feed area of a high speed propulsion unit.
Figure 2:
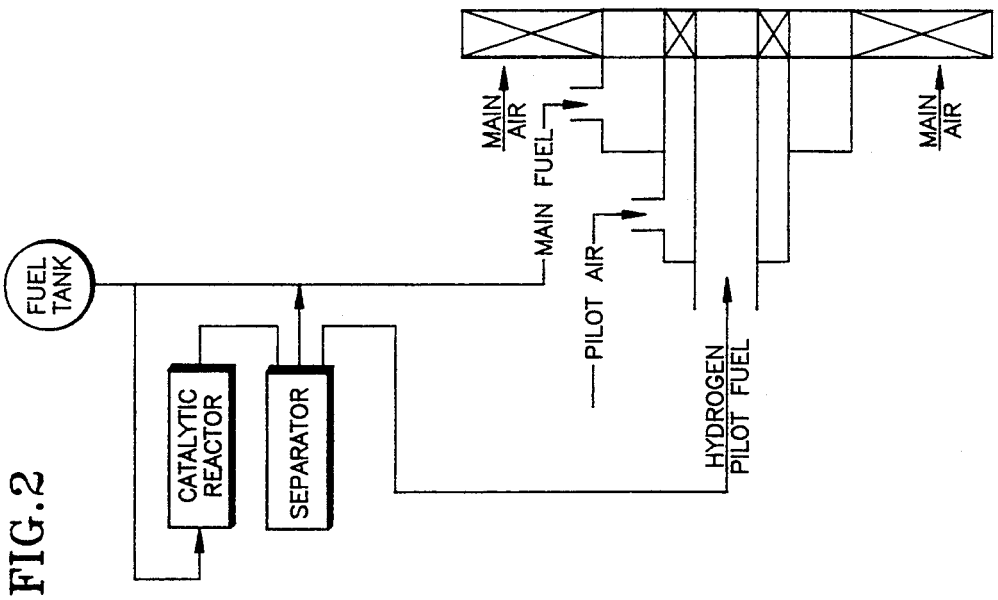
FIG. 2 illustrates a cross-section of the fuel feed area of a high speed propulsion unit.

FIG. 2 shows a schematic cross-section of the fuel feed area of an exemplary high speed propulsion unit such as a ramjet or scramjet. In this embodiment, only a small fraction of the total fuel flow is catalytically decomposed, and the hydrogen is used to fuel a pilot flame. The pilot flame will be stable over a wider operating range than would the original hydrocarbon fuel alone and will anchor the main flame. This pilot flame could also be fueled by a mixture of hydrogen and lower molecular weight decomposition products, but the flame would be less stable. A schematic front view of the combustor unit is shown in FIG. 3.

Figure 4:
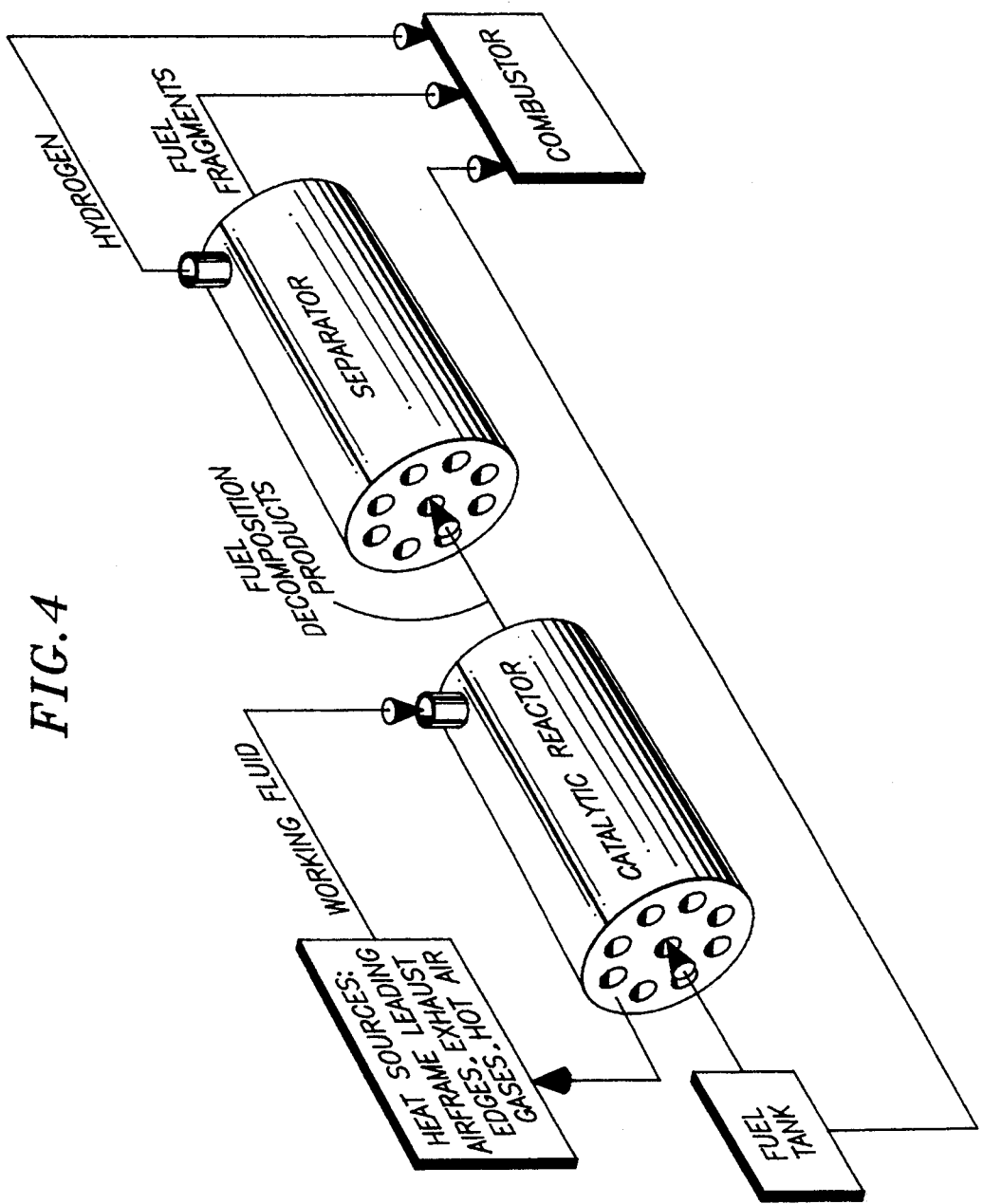
FIG. 4 illustrates a system in which hydrogen is separated from decomposed hydrocarbon fuel and is fed separately to a combustor.

In the embodiment shown in FIG. 4, a liquid hydrocarbon fuel is pumped to a catalytic reactor, vaporized, and at least partially catalytically decomposed to hydrogen and lower molecular weight fuel fragments. The decomposition products enter a separator, preferably containing a palladium membrane, and are separated by molecular size. Hydrogen, smaller fuel fragments, and nondecomposed fuel are then fed into the combustor of a high speed engine at controlled rates to achieve the combustion rate and flame stability necessary for the particular operating conditions.

Figure 5:
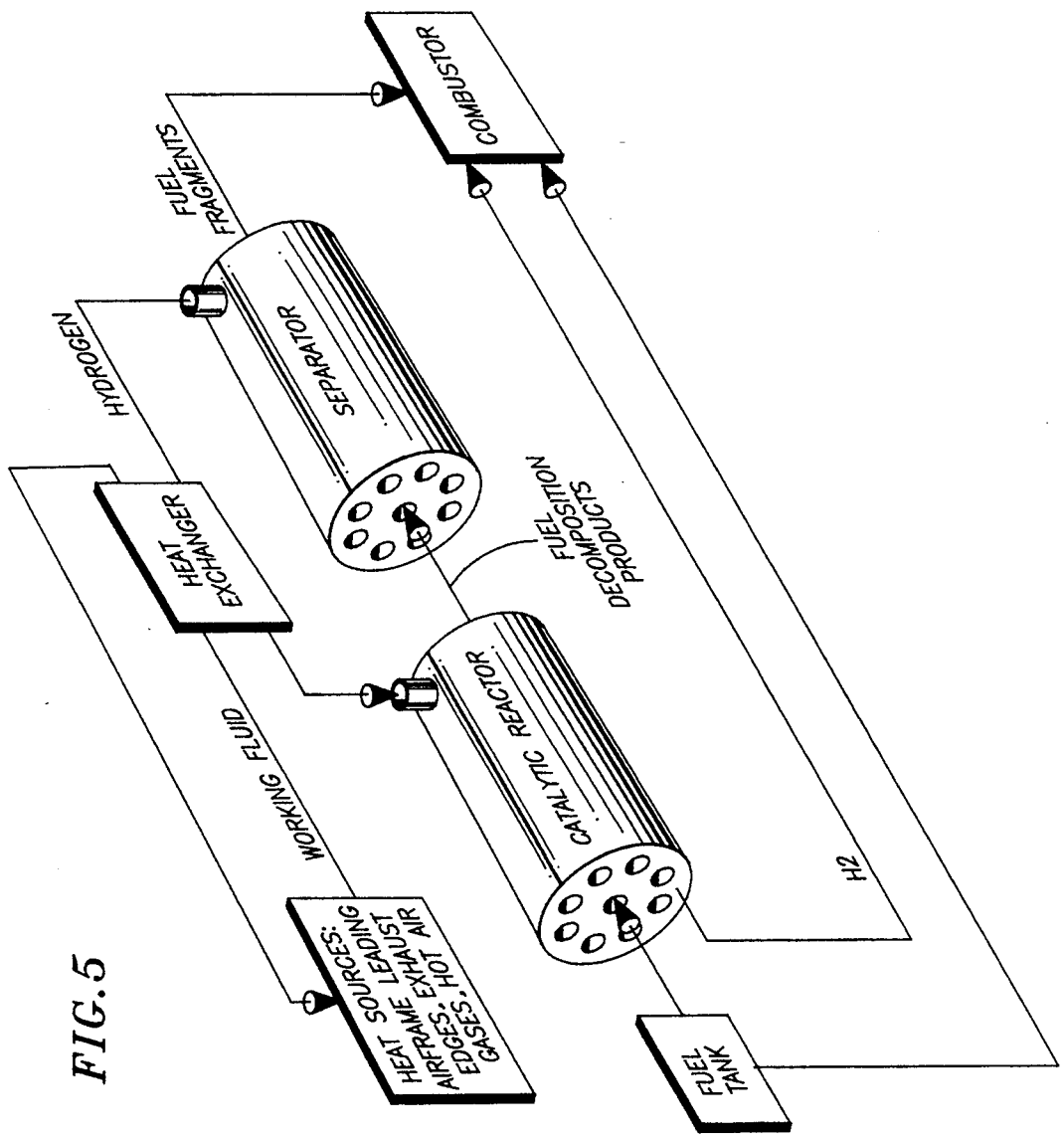
FIG. 5 illustrates a system where hydrogen gas transfers heat from a heat exchanger to a catalytic reactor before the gas is channeled to the combustor.

FIG. 5 shows another embodiment of this invention in which hydrogen and small molecules separated from the rest of the decomposition products are routed back through a heat exchanger to transfer heat from a working fluid to the catalytic reactor. Alternately, the hydrogen stream could itself be used as a working fluid to absorb heat directly from aircraft leading edges and other heat sources for transfer to the reactor. After providing heat to the reactor, the hydrogen stream is fed to a combustor where it enhances combustion rate and flame stability. Using hydrogen gas as a heat exchange medium simplifies the system design and efficiently reclaims heat energy from the hot exhaust gases and other heat sources.

Controlled addition of hydrogen and small molecules to the combustor fuel enhances the combustion process and extends operating limits through better ignition, minimized blowouts, and greater flame stability at lean fuel ratios. Hydrogen enhancement of hydrocarbon combustion may also result in higher combustor efficiency and a potential reduction in combustor length and weight. An accompanying benefit of the method may be reduced engine emissions.

The beneficial effects of adding hydrogen and other small molecule species to hydrocarbon flames are attributable to the inherently higher rate of molecular diffusion characteristic of small molecules in general, and hydrogen in particular. Feeding smaller fuel molecules to the combustor leads to more rapid molecular mixing of fuel and air, which in turn leads to an increased combustion rate and extended extinction limits. Such considerations may be crucial to the operation of high speed propulsion units such as ramjets and scramjets in which fuel residence times in the combustor are in the sub-millisecond range.

Not to be ignored in the operation of aircraft at very high speeds is the need to dissipate considerable amounts of heat from airframe leading edges and other parts of the aircraft. The present invention provides an excellent heat sink for this heat which must be dissipated. As discussed above, the heat would be used to operate the catalytic reactor which endothermically decomposes the fuel. It would provide the sensible heat necessary to heat the fuel to its boiling point, the latent heat of vaporization needed to vaporize it, and the heat of reaction needed to decompose it. Together, these heat loads add up to a considerable heat sink capacity. For example, methylcyclohexane could absorb up to 1905 Btu/lb of fuel decomposed. Other potential fuels could absorb even more heat, as shown in Table 1. Thus, in addition to providing a fuel with superior combustion characteristics due to the presence of hydrogen, the use of catalytically decomposed endothermic fuels provides a means of cooling critical parts of the aircraft. In effect, this invention takes a debit, excess heat, and turns it into an asset by recyling heat from the airframe to the combustion process.

TABLE 1

| Fuel | Maximum Usable Temperature (Tmax) °F. | Total Heat Sink Capacity at Tmax Btu/lb |
|---|---|---|
| Methylcyclohexane | 1340 | 1905 |

TABLE 1-continued

| Fuel | Maximum Usable Temperature (Tmax) °F. | Total Heat Sink Capacity at Tmax Btu/lb |
|---|---|---|
| Decalin | 1340 | 1682 |
| Heptane | 1340 | 2068 |
| Methanol | 1400 | 2561 |
| Propanol | 1340 | 2996 |

Although this invention has been shown and described with respect to detailed embodiments thereof, it will be understood by those skilled in the art that various changes in form and detail thereof may be made without departing from the spirit and scope of the claimed invention.

We claim:

1. A method of extending the operating limits and flame stability of a combustor in a high speed propulsion unit comprising:
   (a) catalytically decomposing at least a portion of a stream of hydrocarbon fuel to produce hydrogen and lower molecular weight fuel fragments;
   (b) separating the decomposition products by molecular size; and
   (c) introducing the hydrogen, lower molecular weight fuel fragments, and nondecomposed hydrocarbon fuel into a combustor of a high speed propulsion unit;

whereby, the introduction of hydrogen and lower molecular weight fuel fragments into the combustor leads to more rapid molecular mixing of fuel and air, which in turn leads to increased combustion rates and extended extinction limits.

2. The method of claim 1 wherein the hydrocarbon fuel is selected from the group consisting of methylcyclohexane, cyclohexane, decalin, methanol, ethanol, propanol, normal paraffins, naphthenes, and mixtures thereof.

3. The method of claim 1 wherein the decomposition is catalyzed by a material selected from the group consisting of platinum, rhodium, iridium, palladium, and mixtures thereof.

4. The method of claim 1 wherein the catalytic decomposition is an endothermic reaction and the source of heat to drive the reaction is selected from the group consisting of airframe leading edges, exhaust gases, hot air, and combinations thereof.

5. The method of claim 1 wherein the decomposition products are separated by means selected from the group consisting of a palladium membrane, hollow glass fibers, and a hydrogen specific polymeric fiber material.

6. A method to provide an effective sink for aerodynamic heat loads of a high speed aircraft while extending the operating limits and flame stability of a combustor in a propulsion unit of an aircraft, comprising:
   (a) transferring heat from a heat source of the aircraft to a catalytic reactor by means of a heat exchange fluid, wherein the heat exchange fluid is nondecomposed hydrocarbon fuel;
   (b) endothermically decomposing a stream of the hydrocarbon fuel in the catalytic reactor to produce hydrogen and lower molecular weight fuel fragments; and
   (c) introducing the hydrogen and lower molecular weight fuel fragments into a combustor of a propulsion unit of the aircraft.

7. A combustion apparatus for use in a high speed propulsion unit comprising:
   (a) a combustor having a hydrogen pilot flame;
   (b) means for catalytically decomposing at least a portion of a stream of hydrocarbon fuel to produce hydrogen and lower molecular weight fuel fragments;
   (c) means for separating hydrogen from decomposition products; and
   (d) means for introducing the hydrogen the combustor to produce a hydrogen pilot flame.

8. The apparatus of claim 7 wherein the hydrocarbon fuel is selected from the group consisting of methylcyclohexane, cyclohexane, decalin, methanol, ethanol, propanol, normal paraffins, naphthenes, and mixtures thereof.

9. The apparatus of claim 7 wherein the decomposition is catalyzed by a material selected from the group consisting of platinum, rhodium, iridium, palladium, and mixtures thereof.

10. The apparatus of claim 7 wherein the means for separating hydrogen from decomposition products is selected from the group consisting of a palladium membrane, hollow glass fibers, and a hydrogen specific polymeric fiber material.

* * * * *